United States Patent [11] 3,596,540

| [72] | Inventor | Donald F. Hooper |
| | | Ben Lomond, Calif. |
| [21] | Appl. No. | 785,700 |
| [22] | Filed | Dec. 20, 1968 |
| [45] | Patented | Aug. 3, 1971 |
| [73] | Assignee | Itek Corporation |

[54] END DRESSING APPARATUS FOR SEMI-RIGID COAXIAL CABLES
10 Claims, 8 Drawing Figs.

[52] U.S. Cl. .................................................... 81/9.5, 30/90.1
[51] Int. Cl. .................................................... H02g 1/12
[50] Field of Search .......................................... 81/9.5, 9.51; 30/90.1, 90.2, 90.3

[56] References Cited
UNITED STATES PATENTS

| 1,567,812 | 12/1925 | Ober et al. ............... | 81/9.5 X |
| 3,225,629 | 12/1965 | Horrocks ................. | 81/9.5 |
| 3,495,484 | 2/1970 | Bannell ................... | 81/9.5 |

Primary Examiner—Travis S. McGehee
Attorneys—Homer O. Blair and Robert L. Nathans ABSTRACT: An end dressing apparatus for preparing the ends of small diameter semirigid coaxial cable for receiving a precision end fitting. The apparatus includes a cable clamping and cutting tool alignment means and a pair of cutting tools for removing a portion of the outer conductor and insulator from the end of a coaxial cable and shaping the exposed end of the inner conductor thereof.

PATENTED AUG 3 1971 3,596,540
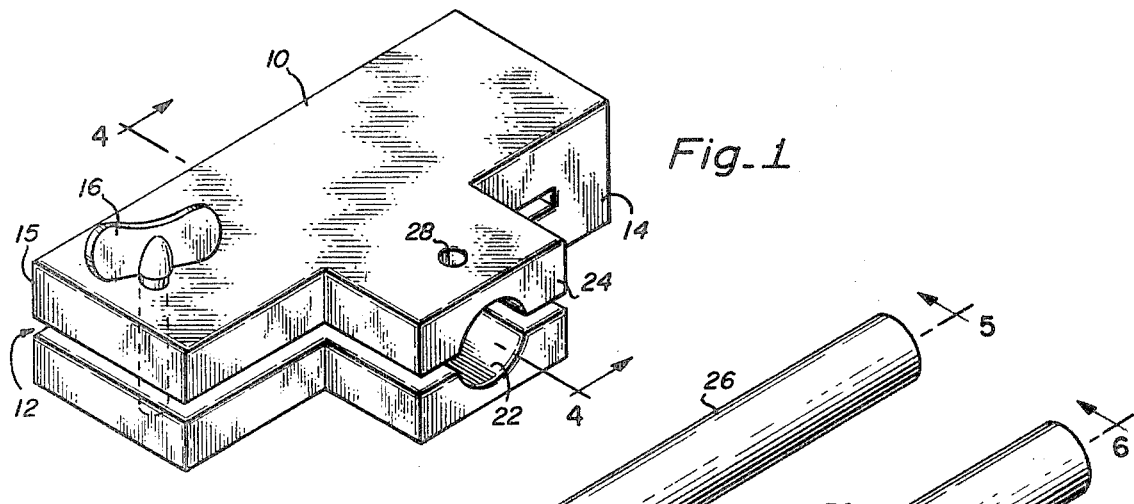
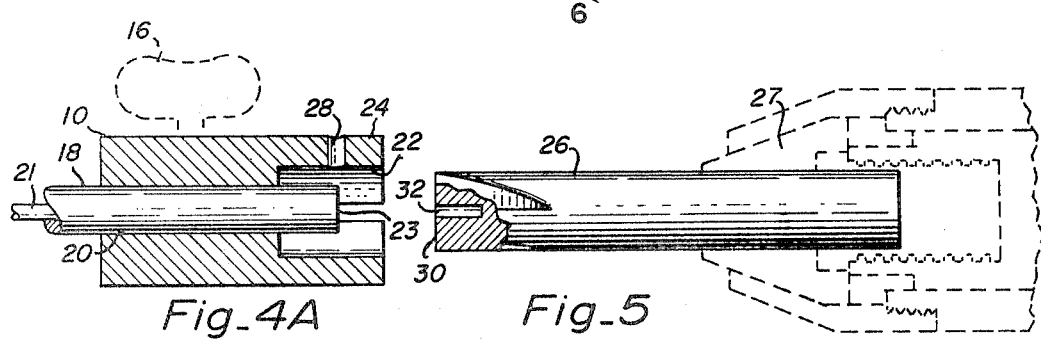
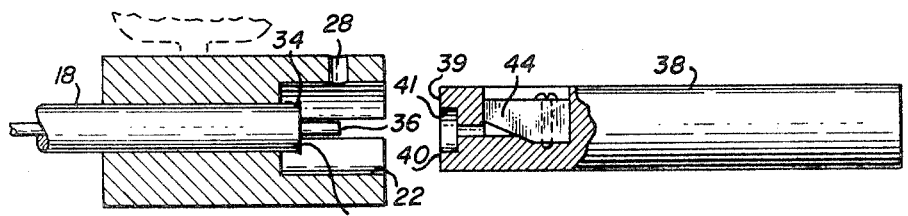
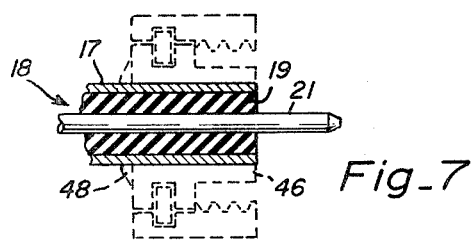
INVENTOR.
DONALD F. HOOPER
BY
Harvey G. Lomhurst
ATTORNEY

END DRESSING APPARATUS FOR SEMI-RIGID COAXIAL CABLES

CHARACTERIZATION OF INVENTION

The invention is characterized by cable clamping and tool alignment means including a first bore for receiving the end of a cable to be dressed, means for clamping said cable in said first bore, and a second bore for receiving a dressing tool, said first and second bores being axially aligned and intersecting; and an elongated cylindrical dressing tool having cutting means disposed on one end thereof said one end being adapted for insertion into said second bore of said cable clamping and tool alignment means for dressing the end of a cable secured therein a predetermined manner.

BACKGROUND OF THE INVENTION

Heretofore the ends of semirigid coaxial cable have been prepared to receive an end fitting by using either a lathe type cutting or scoring apparatus, or by the use of handtools such as saw, file, knife, etc. These methods, especially in the case of small diameter cables, have been both expensive and time consuming and generally objectionable in cases where a large number of cable ends must be prepared.

Examples of prior art apparatus for dressing the ends of a coaxial cable can be found in U.S. Pat. Nos. 2,645,959, 2,789,452, 2,778,255 and 3,161,088. The first two patents disclose relatively complicated apparatus for revolving radial cutting blades about a cable for cutting away the outer conductor and/or insulation.

The latter two patents are directed to handtools for stripping a braided outer conductor and the insulating layer from a coaxial cable. These devices, however, would not be suitable for use in preparing the ends of small diameter semirigid coaxial cable for receiving a coaxial cable end fitting since the end of the semirigid cable must be precision dressed both as to length and diameter.

SUMMARY OF THE INVENTION

The present invention is related generally to apparatus for dressing the ends of a coaxial cable and, more particularly, to an end dressing tool for preparing the ends of a small diameter semirigid coaxial cable for receiving a precision end fitting.

The apparatus of the present invention is comprised of a cable clamping and cutting tool guide means, and a pair of cutting tools which are received by an aperture of the clamping means for alignment with the cable so that the end thereof may be rapidly dressed. The cutting tools may be rotated by hand or may be inserted in a hand drill so as to further speed the dressing operation.

It is therefore a principal object of the present invention to provide a simplified apparatus for dressing the ends of a semirigid coaxial cable.

Another object of the present invention is to provide a means for accurately trimming back the insulation and outer conductor of a semirigid coaxial cable a predetermined distance from the end of the cable so as to provide a well dressed end suitable for receiving an end fitting.

Still another object of the present invention is to provide a novel end dressing tool for a semirigid coaxial cable which allows precision preparation of the cable end with a minimum number of operative steps which can be quickly executed.

Still other objects and advantages of the present invention will become apparent after having read the following description of a preferred embodiment which makes reference to the several figures of the drawing.

IN THE DRAWING

FIG. 1 is a perspective view of a cable clamp and cutting tool guide in accordance with the present invention.

FIG. 2 is a perspective view of a cutting tool in accordance with the present invention.

FIG. 3 is a perspective view of a deburring and center conductor sharpening tool in accordance with the present invention.

FIGS. 4a and 4b are cross sections taken along the lines 4—4 of FIG. 1 to illustrate operation of the present invention.

FIG. 5 is a longitudinal section taken along the axis of the cutting tool of FIG. 2.

FIG. 6 is a cross section taken along the longitudinal axis of the deburring and pointing tool of FIG. 3.

FIG. 7 is a cross section taken through the dressed cable end to illustrate the manner in which the end is attached to an end fitting.

DESCRIPTION OF THE PREFERRED EMBODIMENT

Referring now to the drawing, there is shown in FIG. 1 a generally T-shaped clamp member 10 having a slot 12 cut therein which extends just short of the end 14. A thumbscrew 16 is provided at the slotted end 15 so as to form a clamp for receiving a cable end 18 as shown in FIG. 4a which is a cross section taken along the line 4—4 of FIG. 1. The clamp member 10 includes a cable receiving passageway 20, which has a normal diameter slightly larger than the outer diameter of the cable 18 which is to be received therein. By tightening down the thumbscrew 16, the cable 18 may be firmly clamped within the opening 20.

The diameter of the tool receiving passageway 22 provided in the leg 24 of holder 10 is slightly larger than the outer diameter of the tools 26 and 38 shown in FIGS. 2 and 3 so that the tools can be easily inserted therein after the cable 18 has been clamped in place. However, the difference in the tool and guide diameters is close enough to insure accurate tool alignment with the cable end. A view hole 28 is provided in the top side of the leg 24 for facilitating the positioning of the cable 18 into a correct work position within the clamp 10.

The cutting tool 26 includes a cutting face 30 and an axial bore 32 which has a diameter substantially the same as the center conductor 21 of the coaxial cable 18 to be dressed. The axial length of the bore 32 is determined by the desired length to which the insulator and outer shield of the coaxial cable are to be cut away.

In FIG. 4b the cross section of FIG. 4a is repeated showing the cable 18 after the cutting tool 26 has been caused to operatively engage the end of the cable 18 so as to remove the outer conductor 17 and insulator 19 from the center conductor 21. Since the outer conductor 17 of cable 18 is typically of a soft metal, a burred portion 34 is usually left at the trimmed end thereof which must be subsequently removed to allow proper mating with an end fitting. Also, the end 36 of the inner conductor 21 is not yet properly pointed. A deburring and inner conductor sharpening tool 38 such as is illustrated in FIGS. 3 and 6 of the drawing is thus required for finishing the cable end after the use of the cutting tool 26. The end 39 of the tool 38 is of hardened steel and a sharp edge 40 is formed by the bore 41. The inner diameter of the bore 41 is of substantially the same diameter as is the outer diameter of the cable 18 so that the edge 40 removes the burr 34 as it engages the outer conductor 17 of the cable 18.

The bore 41 of the tool 38 terminates in a shoulder 42 and is then reduced down to a diameter slightly larger than that of the conductor 21 so that after the edge 40 has removed the burr 34 and before the end 35 of cable portion 18 strikes the shoulder 42 the end 36 of the center conductor 21 will engage the cutting edge 44 so as to form a suitable point thereon as shown in FIG. 7. The distance between the shoulder 42 and the cutting edge 44 is predetermined by the chosen dressed length of the exposed center conductor 21.

The dressed end of the cable 18 is shown in FIG. 7 which illustrates the manner in which a typical end fitting is positioned thereon. The fitting 46 is typically soldered to the outer conductor 17 of the cable 18 at 48.

In operation, the thumbscrew 16 is loosened and the cable 18 is inserted through the opening 20 in the clamp 10 until the end 21 is visible through the viewing aperture 28. The thumbscrew 16 is then rotated to clamp the cable 18 in the recess 20. The cutting tool 26, which may either be manually rotated or driven by a hand drill 27, is inserted into the guide aperture 22 so as to engage the cable end 23. The tool 26 is then urged leftwardly and rotated so as to cut away the outer conductor 17 and insulator 19 to a depth determined by the length of the bore 32 in the end of tool 26. When the end 36 of the inner conductor 19 abuts the end of the bore 32 of the cutting tool 26, the tool is removed to leave an exposed center conductor 21 and burred edge 34 as shown in FIG. 4b.

The deburring and pointing tool 38 is then inserted into the guide 22 and urged leftwardly while being rotated so that the edge 40 thereof removes the burr 34 from the outer conductor 17 of the cable 18 and the cutting edge 44 causes a point to be formed on the end 36 of the inner conductor 21 before the shoulder 42 of the tool 38 abuts the trimmed end 35 and terminates leftward movement. The tool 38 is then removed and the thumbscrew 16 is unscrewed to release the cable 18, the end of which is now dressed in the manner illustrated in FIG. 7.

Although a simplified embodiment of the present invention has been described in detail, it is contemplated that in order to further reduce the number of operative dressing steps involved, the tools 26 and 38 could be combined into a single embodiment which cuts, deburrs and sharpens the center conductor in a single operation. However, for purposes of simplicity, I prefer that the separate tools 26 and 38 be utilized.

The above-described tool has been found particularly suited for dressing semirigid coaxial cables having outer diameters less than one-fourth inch but is not limited in application to small diameter cables. The apparatus will be equally suited for use in dressing the ends of any larger size of cable. However, because of the physical characteristics of the cutting tools 26 and 38 and their relationship to the particular size cable to be dressed, a separate set of tools is required for each cable size.

After having read the above disclosure, it will be apparent to those of skill in the art that many alterations and modifications of the invention can be made without departing from the merits thereof. It is therefore intended that the appended claims be interpreted as covering all such modifications which fall within the true spirit and scope of the invention.

What I claim is:

1. Apparatus for dressing the end of a coaxial cable comprising:
   cable clamping and tool alignment means including a first bore for receiving the end of a cable to be dressed, means for clamping said cable in said first bore, and a second bore for receiving a dressing tool, said first and second bores being axially aligned and intersecting; and
   an elongated cylindrical dressing tool having cutting means having a greater diameter than the outer diameter of said coaxial cable disposed solely on one end thereof, said one end being adapted for insertion into said second bore of said cable clamping and tool alignment means for dressing the end of a cable secured therein a predetermined manner.

2. Apparatus for dressing the end of a coaxial cable as recited in claim 1 wherein said one end of said dressing tool includes an end cutting means for trimming away a portion of the outer conductor and insulation from the cable end and a cylindrical bore of a predetermined diameter extending along the axis of said tool a predetermined distance from said end cutting means for receiving the inner conductor of said cable, said dressing tool having an outer diameter slightly less than that of said second bore so that when inserted therein said dressing tool is caused to be axially aligned with a cable means clamped in said first bore and extending into said second bore.

3. Apparatus for dressing the end of a cable as recited in claim 2 wherein said cable clamping and tool alignment means includes a cable end aligning means for enabling the cable to be correctly positioned therein.

4. Apparatus for dressing the end of a coaxial cable as recited in claim 3 and further including a second elongated cylindrical dressing tool for engaging the end of the cable after said first dressing tool has been removed therefrom, said second dressing tool including means for removing any burrs on the outer conductor of said cable caused by said first dressing tool.

5. Apparatus for dressing the end of a coaxial cable as recited in claim 4 wherein said second tool further includes means for shaping the end of the inner conductor of said cable means.

6. Apparatus for dressing the end of a coaxial cable as recited in claim 5 wherein said second dressing tool is comprised of elongated cylindrical member having a first bored out portion in one end thereof the diameter of which is substantially the same as the outer conductor of the cable which it is to dress and a second bored out portion coaxial with said first bored out portion but having a diameter slightly larger than that of the inner conductor of said coaxial cable and cutting means disposed at the distal end of said second bore for pointing the end of the inner conductor of a coaxial cable engaged thereby.

7. Apparatus for dressing the end of a coaxial cable comprising:
   cable clamping and cutting tool alignment means including a first cylindrical bore having a diameter substantially the same as the cable to be dressed, and a second cylindrical bore of larger diameter than said first bore, said second bore being axially aligned with said first bore so that a coaxial cable can be clamped in said first bore with its end extending into said second bore; and
   an elongated end dressing tool of substantially the same outer diameter as said second bore so that said end dressing tool can be inserted into said second bore for engaging the end of said cable and dressing the end thereof.

8. Apparatus for dressing the end of a coaxial cable as recited in claim 7 wherein one end of said dressing tool includes an end cutting means for cutting away the outer conductor and insulation from the cable end and a cylindrical bore of a predetermined diameter for receiving the inner conductor of said cable, said cylindrical bore extending along the axis of said tool a predetermined distance from said end cutting means.

9. Apparatus for dressing the end of a coaxial cable as recited in claim 8 and further including a second dressing tool for engaging the end of said cable after said first dressing tool has been removed therefrom, said second dressing tool including means for removing burrs created on the outer conductor of said cable by said first dressing tool.

10. Apparatus for dressing the end of a coaxial cable as recited in claim 9 wherein said second dressing tool further includes means for shaping the end of the inner conductor of said cable means.